United States Patent
Jagirdar et al.

(10) Patent No.: US 12,055,315 B2
(45) Date of Patent: Aug. 6, 2024

(54) SYSTEM AND METHOD FOR DEHUMIDIFICATION

(71) Applicant: National University of Singapore, Singapore (SG)

(72) Inventors: Mrinal Jagirdar, Singapore (SG); Poh Seng Lee, Singapore (SG)

(73) Assignee: National University of Singapore, Singapore (SG)

( * ) Notice: Subject to any disclaimer, the term of this patent is extended or adjusted under 35 U.S.C. 154(b) by 829 days.

(21) Appl. No.: 16/973,391

(22) PCT Filed: Jun. 10, 2019

(86) PCT No.: PCT/SG2019/050293
§ 371 (c)(1),
(2) Date: Dec. 8, 2020

(87) PCT Pub. No.: WO2019/236012
PCT Pub. Date: Dec. 12, 2019

(65) Prior Publication Data
US 2021/0254842 A1  Aug. 19, 2021

(30) Foreign Application Priority Data
Jun. 8, 2018 (SG) .................. 10201804925V (51) Int. Cl.
*F24F 3/14* (2006.01)
*B01D 53/04* (2006.01)
*B01D 53/26* (2006.01)

(52) U.S. Cl.
CPC ............ *F24F 3/14* (2013.01); *B01D 53/0407* (2013.01); *B01D 53/261* (2013.01);
(Continued)

(58) Field of Classification Search
CPC ..... F24F 3/14; B01D 53/0407; B01D 53/261; B01D 2253/108; B01D 2253/202;
(Continued)

(56) References Cited

U.S. PATENT DOCUMENTS

2012/0243180 A1   9/2012  Lee et al.

FOREIGN PATENT DOCUMENTS

CN   101464075 A   6/2009
CN   101699177 A   4/2010
(Continued)

OTHER PUBLICATIONS

Foreign Communication from a Related Counterpart Application, International Search Report and Written Opinion dated Oct. 15, 2019, International Application No. PCT/SG2019/050293 filed on Jun. 10, 2019.

*Primary Examiner* — Robert Clemente
(74) *Attorney, Agent, or Firm* — Conley Rose P.C.

(57) ABSTRACT

A heat and mass exchanger system comprising: a first array of tubes, each of said tubes having an coating of a desiccant about a peripheral surface; an interstitial space between said tubes, said interstitial space arranged to receive a fluid, such that at least a portion of the peripheral surface is a wetted area of said fluid; said tubes arranged to transport a heat transfer liquid within an internal bore, said fluid and heat transfer liquid in heat transfer communication; wherein the cross sectional shape of each of said tubes is convex.

13 Claims, 6 Drawing Sheets

(52) U.S. Cl.
CPC .. *B01D 2253/108* (2013.01); *B01D 2253/202* (2013.01); *B01D 2257/80* (2013.01); *B01D 2259/40092* (2013.01); *B01D 2259/4508* (2013.01)

(58) Field of Classification Search
CPC ...... B01D 2257/80; B01D 2259/40092; B01D 2259/4508
See application file for complete search history.

(56) References Cited

FOREIGN PATENT DOCUMENTS

| | | |
|---|---|---|
| CN | 203183895 U | 9/2013 |
| WO | 2019236012 A1 | 12/2019 |

SYSTEM AND METHOD FOR DEHUMIDIFICATION

CROSS-REFERENCE TO RELATED APPLICATIONS

The present application is a filing under 35 U.S.C. 371 as the National Stage of International Application No. PCT/SG2019/050293, filed Jun. 10, 2019, entitled "SYSTEM AND METHOD FOR DEHUMIDIFICATION," which claims priority to Singapore Application No. SG 10201804925V filed with the Intellectual Property Office of Singapore on Jun. 8, 2018, both of which are incorporated herein by reference in their entirety for all purposes.

FIELD OF THE INVENTION

The invention relates to the use of desiccant coated heat and mass exchange devices for dehumidification.

BACKGROUND

Maintaining indoor thermal comfort of occupants using HVAC equipment is a multi-billion dollar industry. Apart from maintaining comfortable indoor temperature, indoor humidity level is also regulated to ensure good health and comfort of occupants. In fact, for humid environments, latent heat load (pertaining to the moisture removal) can be ~50% of the total air-conditioning load.

There is, therefore, a clear need to continually seek better and more efficient heat and mass exchanger systems

SUMMARY OF INVENTION

In a first aspect, the invention provides a heat and mass exchanger system comprising: a first array of tubes, each of said tubes having an coating of a desiccant about a peripheral surface; an interstitial space between said tubes, said interstitial space arranged to receive a fluid, such that at least a portion of the peripheral surface is a wetted area of said fluid; said tubes arranged to transport a heat transfer liquid within an internal bore, said fluid and heat transfer liquid in heat transfer communication; wherein the cross sectional shape of each of said tubes is convex.

In a second aspect, the invention provides a method of humidifying air, the method comprising the steps of: flowing a air into interstitial space within a first array of desiccant coated tubes, said tubes having a convex cross-sectional shape; simultaneously passing a heated heat transfer liquid through a bore of said tubes, and so extracting moisture from the fluid and; impregnating the desiccant with moisture from said air.

Making moisture removal more efficient may lead to a very significant reduction in energy consumption. Thus, implementing a heat and mass exchange system according to the present invention, may provide for superior performance, using components which are less expensive to manufacture and maintain.

BRIEF DESCRIPTION OF DRAWINGS

It will be convenient to further describe the present invention with respect to the accompanying drawings that illustrate possible arrangements of the invention. Other arrangements of the invention are possible and consequently, the particularity of the accompanying drawings is not to be understood as superseding the generality of the preceding description of the invention.

DETAILED DESCRIPTION

The invention involves a desiccant coated bank, or array, of tubes (DCBT) that act as a heat and mass exchanger. The tubes are coated with a solid-desiccant on the external surface of the tubes. A heat transfer liquid (such as water) coolant, at approximately ambient or wet-bulb temperature flows through the tubes to remove the heat of adsorption released during dehumidification. This provides close to isothermal dehumidification.

The array of tubes may be located in a purpose made chamber so as to allow the flow of moist air around the tubes and so facilitate heat and mass exchange between the heat transfer liquid flowing within the tubes and the moist air flowing about the tubes. It will be appreciated that the array of tubes may be located within a larger chamber accommodating other components so long as the moist air is free to pass through the interstitial spaces between said tubes.

In one example of the system, there may be two sources of water, source 1 at 30° C. and source 2 at 40° C.

Figure 3:
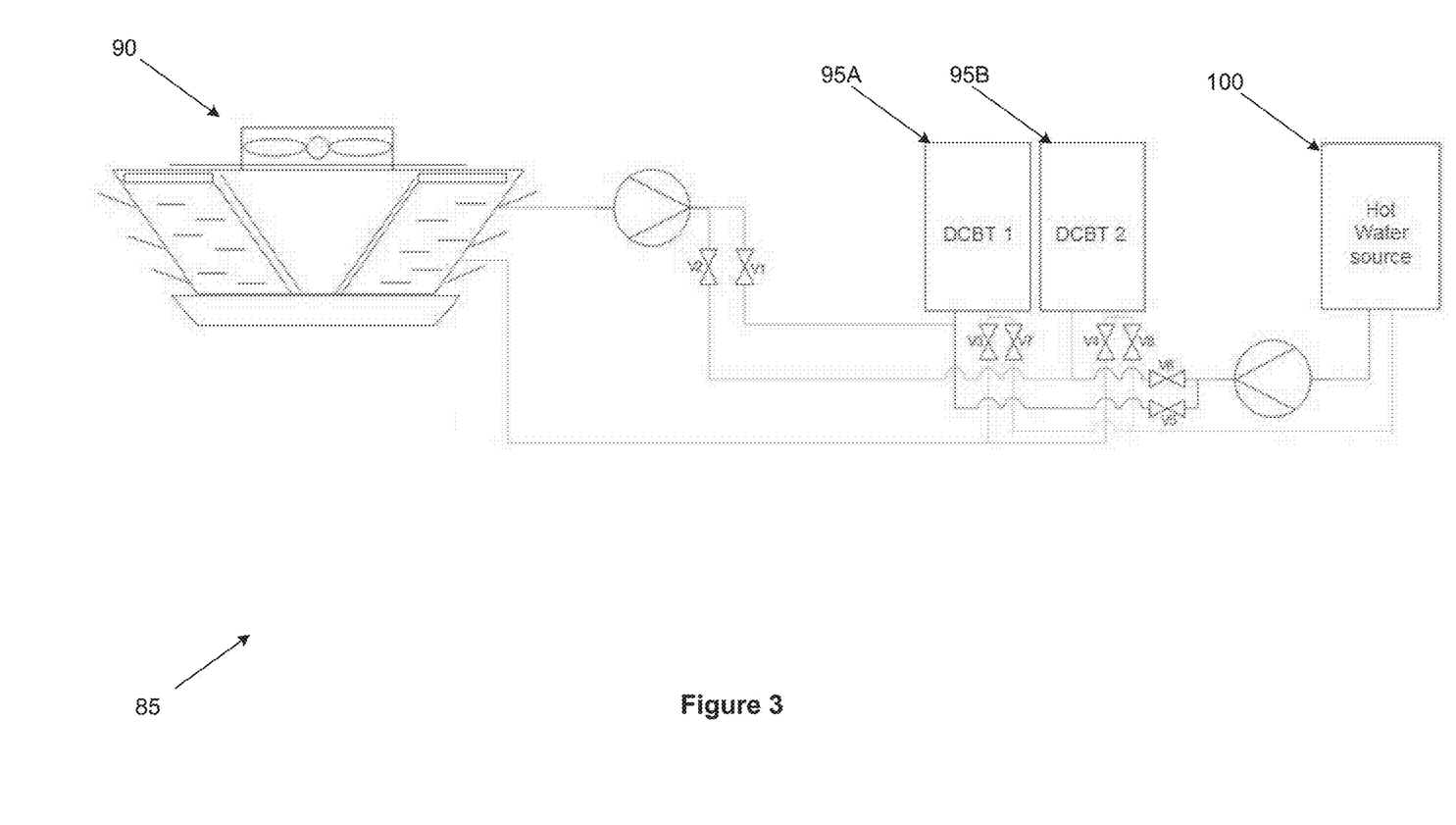
FIG. 3 is a schematic view of a heat and mass exchange system for a cooling tower according to one embodiment of the present invention.
Figure 4:
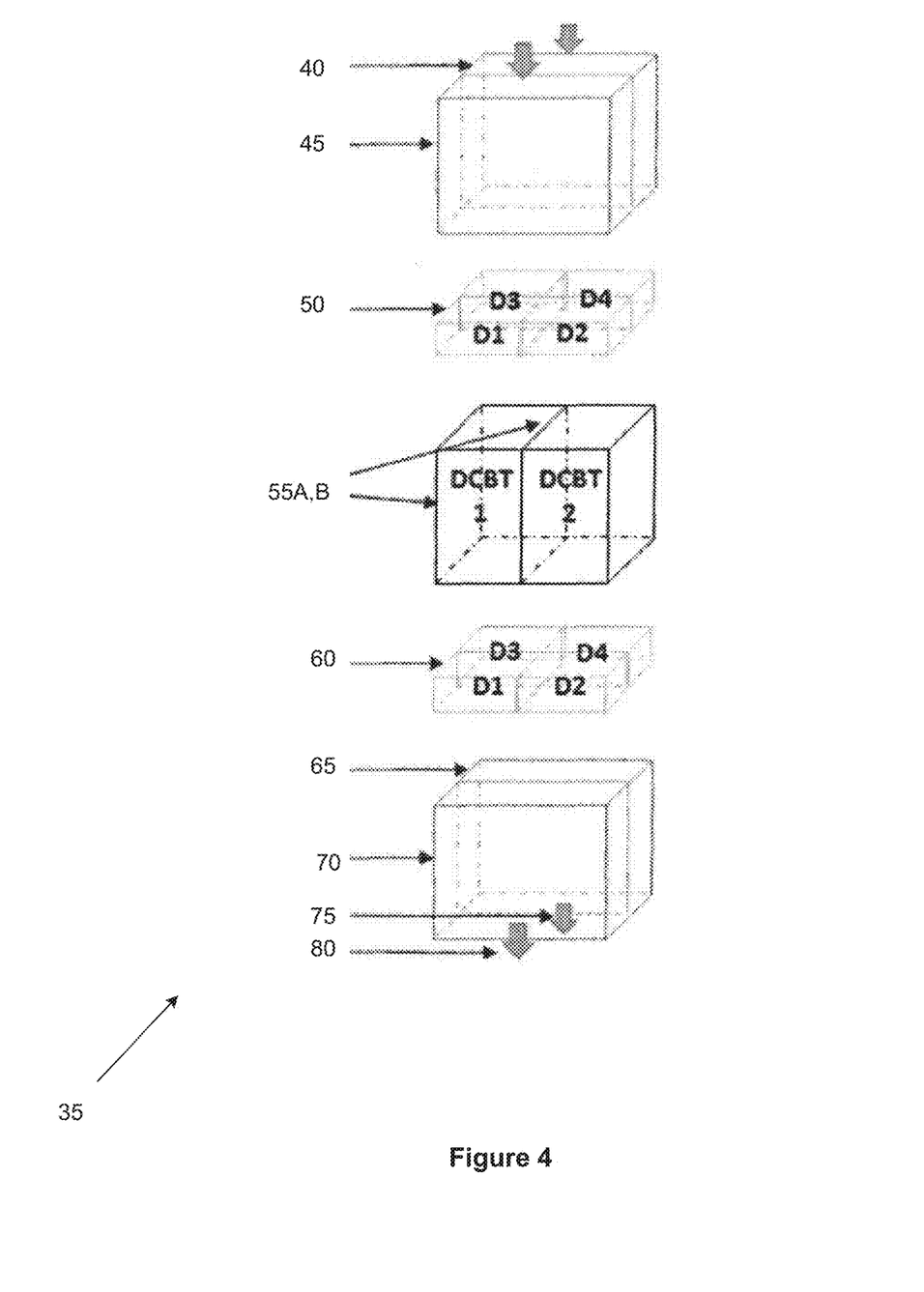
FIG. 4 is a schematic view of an HVAC system having a heat and mass exchanger according to one embodiment of the present invention.

Further two air inflows are provided, being air-stream 1 and air-stream 2, which are directed into two arrays DCBT1 and DCBT2. The water pipes and the air-ducting around the two DCBT1 and DCBT2 are as shown in FIGS. 3 and 4.

In the first 5 minutes, when DCBT1 is dehumidifying the air-stream 1, water from water-source 1 is flowing through the tubes of DCBT1. Simultaneously, DCBT2 is getting regenerated, it is necessary that water from source 2 flows through it. It is also necessary that air-stream 2 flows through it, so that the moisture from DCBT2 may be carried.

Basically the air that conducts regeneration becomes moist/humid. Note that regeneration of desiccant (DCBT) means that the air flowing past the desiccant (DCBT) is being humidified (so regeneration process=humidification process).

Then for the next 5 minutes, DCBT 1 is regenerated due to water from water-source 2 flowing through the tubes and air-stream 2 flowing past it (note that since air-stream 2 takes up the moisture, it gets humidified as it flows through the DCBT to be regenerated). Simultaneously, DCBT 2 is now dehumidifying air-stream 1 while water from water-source 1 is flowing through DCBT 2.

Note that when dehumidification is the main purpose of using this invention, air-stream 1 after getting dehumidified by DCBT 1 and 2 alternatively, is utilized as the end-product.

Note that when humidification is the main purpose of using this invention, air-stream 2 after regenerating the desiccant of DCBT 2 and 1 alternatively, is utilized as the end-product.

Figure 1:
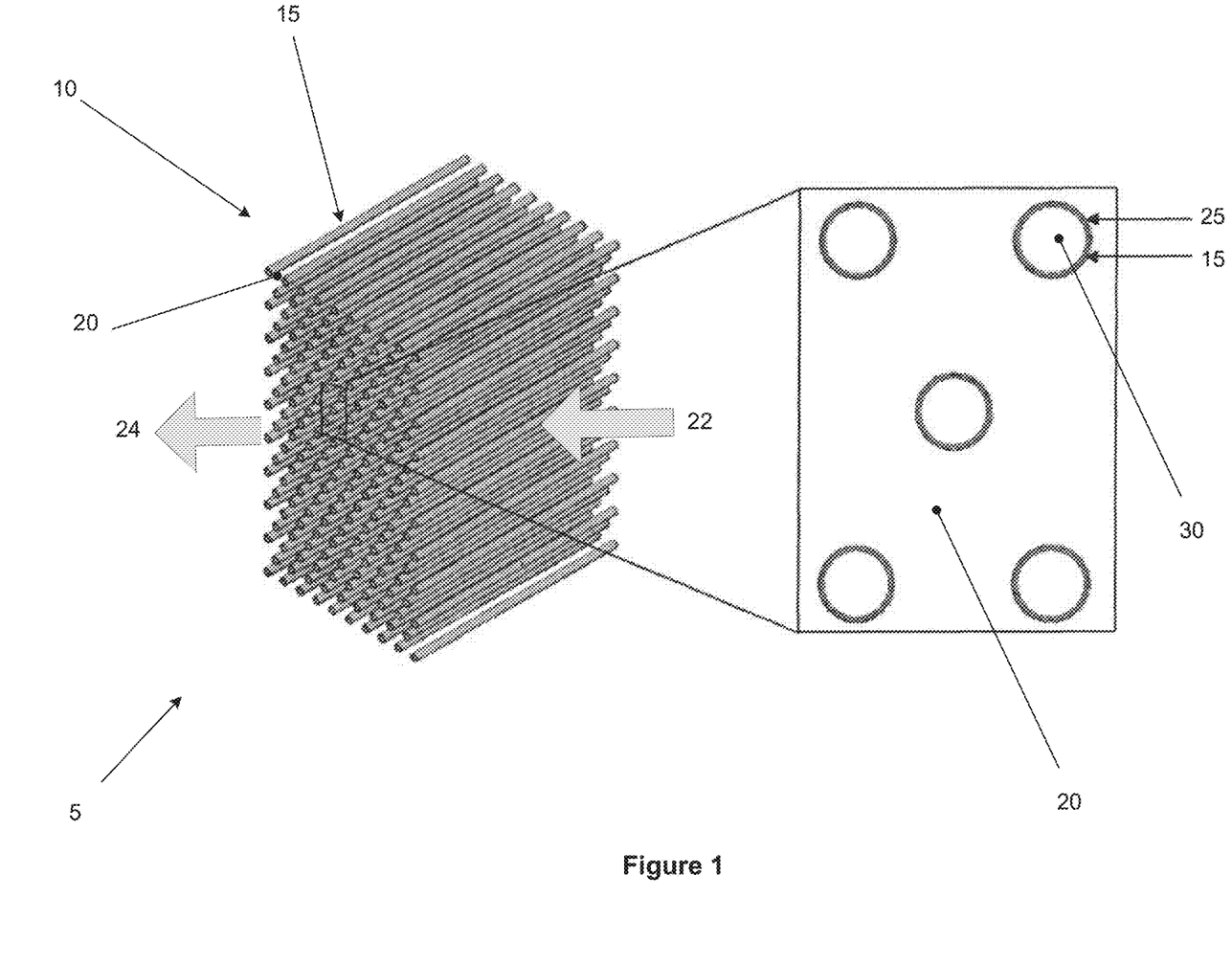
FIG. 1 is an isometric and detailed view of a heat and mass exchanger array according to one embodiment of the present invention.

With this basic description of the process in mind, reference is now made to the figures. To this end, FIG. 1 shows one such arrangement having an array of tubes 5. Each tube 15 includes a desiccant coating 25. The type of desiccant considered for the present invention may include silica gel, zeolite or other suitable polymer desiccant material. Other materials known in the art may also be considered for the present invention.

As mentioned, each of the tubes 15 are separated by interstitial spaces 20 to allow the moist air 22 to flow there between. The heat transfer liquid passes through the bore 30 of the tubes 15 so as to be in heat transfer communication with the air flowing around said tubes, removing moisture from the inflowing air and absorbing the moisture into the desiccant. The dehumidified air 24 then exits the array.

Figure 2:
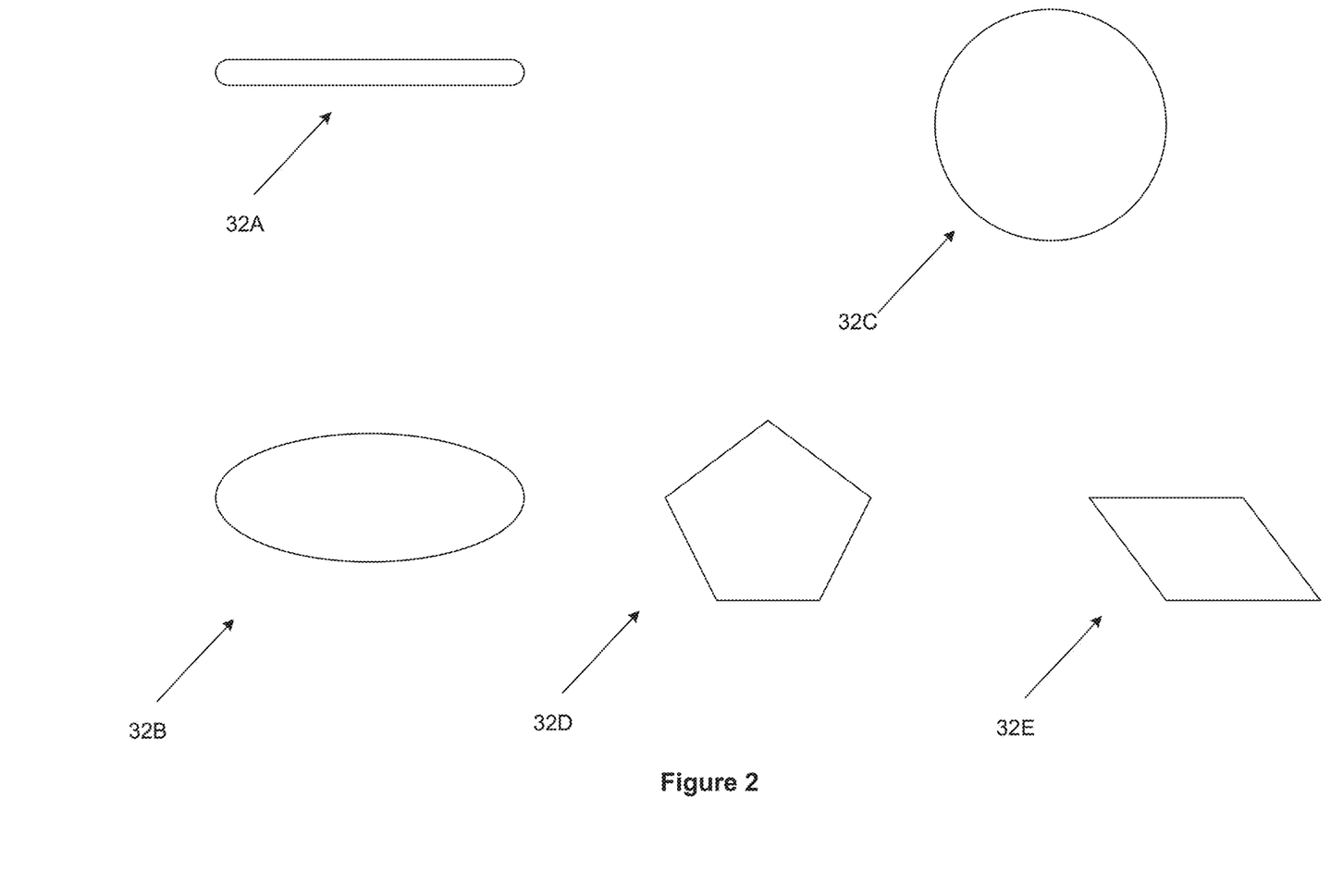
FIG. 2 shows cross-sectional views of convex shapes according to several embodiments of the present invention.

As shown in FIG. 2 the tubes have a convex cross-sectional shape which may be in the form of a flat strip 32A, an ellipsoid 32B, a circle 32C, a regular convex polygon, such as a pentagon 32D, or an irregular convex polygon, such as an oblique 32E. It will be for the designer to determine which of the shapes suit the application best on the understanding that all convex shapes fall within the present invention. In various embodiments, said tubes having convex shapes also include a complete wetted circumference or peripheral surface, that is, peripheral surface of said coated tubes are open to be in contact with the inflowing air and so maximize the surface area through which the heat transfer may occur. This further leads to the desiccant coating forming a layer about the entire peripheral surface, and so the wetted peripheral surface of the tube corresponds to the desiccant coating.

In a further embodiment, regeneration using a hot coolant (such as water) flowing through the tubes supply the heat of desorption of the moisture in the desiccant. This provides near isothermal (in case of hot coolant) or isenthalpic (in case of hot air) regeneration. To ensure continuous dehumidification of air, two DCBTs need to operate simultaneously; while one DCBT dehumidifies the supply air, the other DCBT is regenerated.

For instance, FIG. 3 shows a heat and mass exchange system 85 Here the heat transfer liquid for promoting absorption by the desiccant is provided by a cooling tower 90, with the desorption heat transfer liquid provided by a hot water source 100, such as a solar hot water system or a condenser. The DCBT arrays 95A, 95B receive an air flow from a source (not shown) in the interstitial spaces between the tubes.

In a first cycle, cold water is passed into the tubes of the first array 95A whereby the inflow of air has moisture extracted, so as to be absorbed by the desiccant. Once the desiccant of the first array 95A has become saturated, air flow is diverted to the second array 95B and so providing a seamless dehumidification process. Whilst the second array 95B is in operation, hot water 100 is passed 105 to the first array 95A so as to regenerate the desiccant coating in preparation for the next cycle.

The cycle is repeated once the second array 95B is saturated and the first array 95A regenerated. Accordingly, having two parallel arrays with selective diversion of the cold and hot water through the bore of the tubes, continuous dehumidification can be achieved through a two cycle cooling/regeneration process.

When applied to an HVAC system 35, as shown in FIG. 4, a supply of air 40 is diverted into a regeneration air duct 45 and consequently directed to either the first array 55A or the second array 55B by selectively operable dampers 50. A second array of dampers 60 then directs air to either the exhaust air duct for the regenerating array or to the supply air duct for the active array. The exhaust air 75 and supply air 80 are then consequently directed appropriately. At the same time, cold water is passed through the tubes of the first DCBT array 55A, and hot water through the second DCBT array 55B.

It will be appreciated that once the second array 55B has regenerated and the first array 55A has become saturated, the dampers 50 and 60 switch will re-distribute the supply air and the exhaust air as appropriate. Thus, the HVAC system shown in FIG. 4 operates in a similar way with the two array DCBT system as shown for the dehumidification system of FIG. 3.

Having tubes with a convex shape with an array for heat and mass exchange, provides several key advantages:

(a) Smaller pressure drop since the air-passage available is larger and hydraulic diameter is greater. The convex shape avoids shock losses and flow blockages that will hinder the flow characteristic of the heat and mass exchanger. This is compared with the use of conventional heat and mass exchanger fins that impede flow in order to maximise surface area. However, using the present invention eliminates this comprise by reducing the diameter of the tubes, in order to achieve the surface area but maintain good flow characteristics;

(b) Simpler construction and assembly since there are only tubes, hence tube-geometry can be varied easily. This, again, compares to heat and mass exchanger fins which are generally more complex, and so more difficult to manufacture and maintain. For instance, a calcium, or oxide build up within a space between the fins eliminates the heat and mass exchange efficiency, and may be very difficult to remove;

(c) Desiccant can be easily coated uniformly by methods such as (but not limited to) spraying. This is not convenient for finned tubes as the small fin pitch may limit evenness of coating.

(d) Variation in desiccant layer thickness may be designed and implemented given the uniform pitch in the interstitial spaces of the array. This pitch may be an order of magnitude larger than that between fins, whereby a larger desiccant thickness may induce very high pressure drop penalty, since cross-section area for air-passage is significantly reduced;

(e) The adsorbent temperature may be lower during dehumidification for the present invention as no extra thermal resistance due to fins comes into play so that adsorption heat is directly taken up by water flowing within the tubes. This improves desiccant adsorption and dehumidification of air;

(f) Heat transfer coefficient between air and adsorbent may be lower for the present invention. This would ensure that heat released into the adsorbent during dehumidification, would not easily be transferred to the air. Thus outlet air from the DCBT would be lower. This is beneficial for the aforementioned HVAC application. It may be noted that lower heat transfer coefficient would generally mean lower mass transfer coefficient, however, dehumidification performance of desiccant is more strongly dependent on temperature (of adsorbent and air) and sorbate uptake of desiccant. Thus, overall, lowering the air-side transfer coefficient is beneficial;

(g) A heat and mass exchanger according to the present invention may enables a narrow range of hot and cool water temperature, for example 36° C. hot water during regeneration and 28° C. cool water during dehumidification. This may also enable it to be used with conventional HVAC systems with condenser waste heat.

This invention serves to either work as a stand-alone device or complement HVAC equipment, by dehumidifying/pre-dehumidifying air for indoor thermal comfort of occupants and potentially for outdoor cooling as well.

Energy efficient dehumidification using low-grade (condenser waste-heat/solar) heat for regeneration. Total power consumption for achieving indoor thermal comfort may be lower:
  a. Reduction of cooling load on the compressor, thereby aiding in its capacity/size reduction. Latent heat load is in-fact taken up by the liquid coolant at ambient (or wet-bulb) temperature which is rejected to the atmosphere via a condenser (or a cooling tower).
  b. Depending on weather conditions, it may eliminate the necessity for air to be cooled below the required dew-point temperature, thereby improving the e.O.P. of the system.

The most commonly used vapour compression refrigeration systems often over-cool the air to below the dew-point temperature (of supply air to air-conditioned space) to remove moisture. In contrast, desiccant systems can adsorb moisture efficiently even when air is not saturated (considerably above the dew point temperature). This makes desiccant based systems attractive since they can potentially save energy by (i) reducing latent heat load, on other HVAC equipment (ii) improve the COP by eliminating the need for over-cooling air below the, required supply air dew-point temperature.

However, they require high temperature heat for regeneration (typically >80° C.), moreover, the adsorption, process is adiabatic which makes adsorption less effective and more energy intensive. This is one of the main bottle-neck for its wide-spread commercial use. The present invention is a dehumidifier that works on (nearly) isothermal dehumidification process to dehumidify air which enables it to be regenerated at a much lower, temperature.

TABLE #1

| Parameter | DCFTHX | DCBT |
|---|---|---|
| $X_l$ | 22 mm | 22 mm |
| $X_t$ | 25 mm | 25 mm |
| $d_i$ | 8.5 mm | 8.5 mm |
| $d_o$ | 9.5 mm | 9.5 mm |
| $L_x$ | 0.044 m | 0.97 m |
| $L_y$ | 0.2 m | 0.2 m |
| $L_z$ | 0.2 m | 0.2 m |
| $H_d$ | 0.2 mm | 0.2 mm |
| $U_{fr}$ | 1.5 m/s | 1.5 m/s |
| $m_w$ | 0.16 kg/s | 0.16 kg/s |
| $P_f$ | 1.5 mm | — |

Figure 6A:
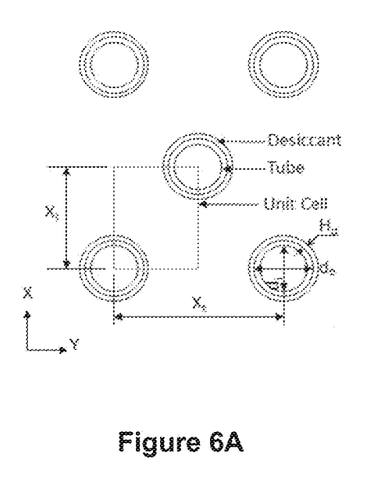
FIGS. 6A and 6B are schematic views of a system according to one embodiment of the present invention.
Figure 6B:
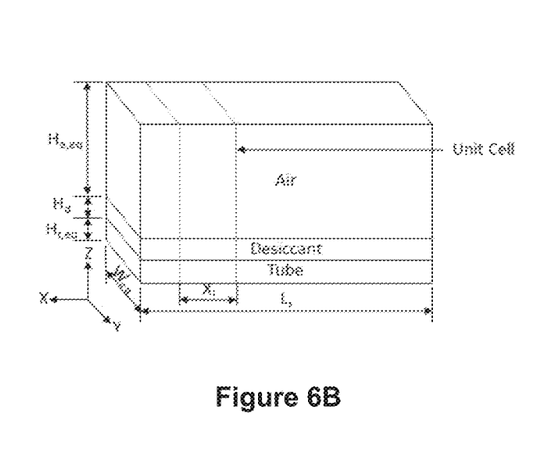

Table #1, FIGS. 6A and 6B show geometrical and flow parameters used for simulation of a desiccant coated fin tube heat and mass exchanger (DCFTHX) and a DCBT, both having the same desiccant area, for ambient air at 32° C., 65% RH (Yinlet=0.02 kg/kg d.a.) and hot water available at 50° C. Indoor air having specific humidity of =0.011 kg/kg d.a. is used for regeneration.

Figure 5A:
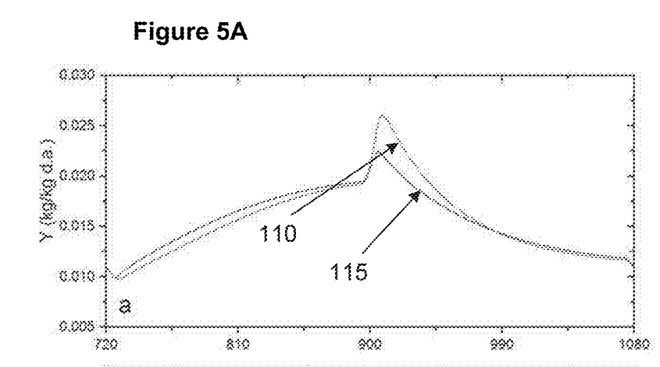
FIGS. 5A to 5C show various charts according to the operation of a system according to one embodiment of the present invention.
Figure 5B:
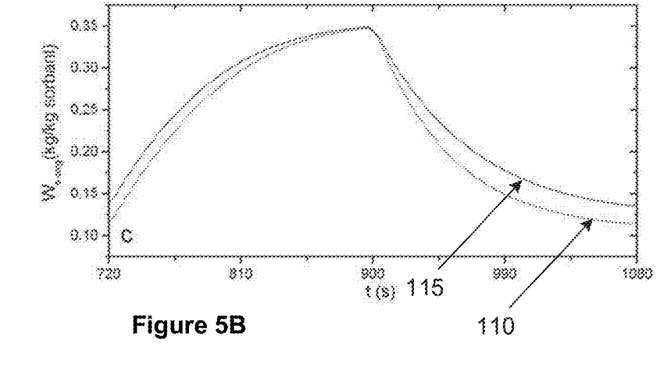
Figure 5C:
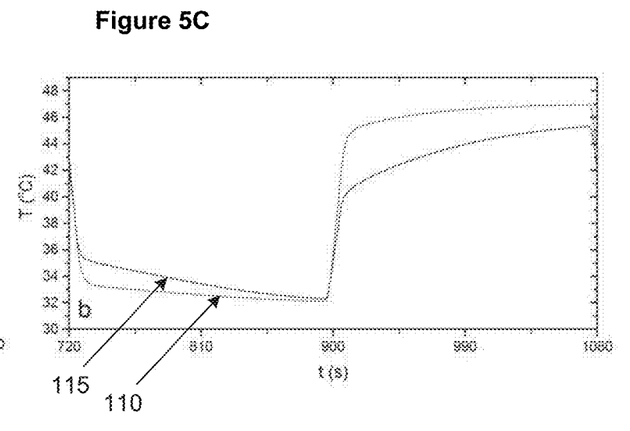

FIGS. 5A to 5C show time varying quantities during a 360 second cycle of dehumidification (from 720 to 900 seconds) and regeneration (from 900 to 1080 seconds) for DCBT and DCFTHX (a) outlet specific humidity of air (b) outlet temperature of air (c) spatial average sorbate uptake of the desiccant Table #2 provides a time-averaged performance comparison of DCBT and DCFTHX in terms of Y (average outlet air specific humidity during dehumidification), T (average outlet air temperature during dehumidification), cooling capacity and electrical power consumption

TABLE #2

| Configuration | Y (Kg/kg d.a.) | T (° C.) | Cooling Capacity (W) | Electrical power consumption (W) |
|---|---|---|---|---|
| DCFTHX | 0.0159 | 33.73 | 597.89 | 31.82 |
| DCBT | 0.0153 | 32.91 | 769.10 | 23.55 |

FIGS. 5A to 5C and Table #2 show that a DCBT according to the present invention is capable of lowering the specific humidity of air better than a comparable DCFTHX. The outlet air temperature as well as humidity are lower for DCBT leading to its superior cooling capacity. Moreover, even the electrical power consumed by auxiliary equipment such as pumps and blowers is lower for DCBT. Thus superiority of DCBT is well established.

Depending on the application requirement as well as outdoor weather conditions, the present invention may be used in conjunction with conventional HVAC systems, which may either be a new installation or an existing one, operating on vapour compression refrigeration cycle, by using heat which maybe from water-cooled or air-cooled condenser or solar-heat or low grade waste heat. It may also be used instead with direct/indirect evaporative coolers or even as a stand-alone equipment. Results clearly indicate the substantial reduction in humidity by a system according to the present invention which may provide substantial power savings and energy conservation.

The invention claimed is:

1. A heat and mass exchanger system comprising:
   a first array of tubes, each of said tubes having a coating of a desiccant about a peripheral surface;
   an interstitial space between said tubes, said interstitial space arranged to receive a fluid, such that at least a portion of the peripheral surface is a wetted area of said fluid;
   said tubes arranged to transport a heat transfer liquid within an internal bore, said fluid and heat transfer liquid in heat transfer communication;
   wherein the cross-sectional shape of each of said tubes is convex.

2. The heat and mass exchanger system according to claim 1, wherein the entire peripheral surface is arranged to be wetted by said fluid.

3. The heat and mass exchanger system according to claim 2, wherein the heat transfer liquid is arranged to be at a dehumidifying temperature, such that the heat and mass exchanger quasi-isothermally manages a latent heat load.

4. The heat and mass exchanger system according to claim 2, further including a second array of tubes, said heat and mass exchanger arranged to alternate between a first cycle of providing the heat transfer liquid to the first array and the gas to the second array sub-array so as to regenerate the desiccant, and a second cycle of applying the gas to the first array and the heat transfer liquid to the second array.

5. The heat and mass exchanger system according to claim 1, wherein the heat transfer liquid is arranged to be at a dehumidifying temperature, such that the heat and mass exchanger quasi-isothermally manages a latent heat load.

6. The heat and mass exchanger system according to claim 5, further including a second array of tubes, said heat and mass exchanger arranged to alternate between a first cycle of providing the heat transfer liquid to the first array and the gas to the second array so as to regenerate the desiccant, and a second cycle of applying the gas to the first array and the heat transfer liquid to the second array.

7. The heat and mass exchanger system according to claim 1, further including a second array of tubes, said heat and mass exchanger arranged to alternate between a first cycle of providing the heat transfer liquid to the first array and the fluid to the second array so as to regenerate the desiccant, and a second cycle of applying the fluid to the first array and the heat transfer liquid to the second array.

8. The heat and mass exchanger system according to claim 1, wherein heat used for regeneration is provide from one or a combination of sources including: solar thermal, solar voltaic heating elements, geothermal, waste heat from a power plant, condenser of a conventional HVAC system.

9. The heat and mass exchanger system according to claim 1, wherein the tubes have an oblique cross-sectional shape.

10. A method of varying humidity of a gas, the method comprising the steps of:
flowing the gas into interstitial space within a first array of desiccant coated tubes, said tubes having a convex cross-sectional shape;
simultaneously passing a cool heat transfer liquid through a bore of said tubes, and so
extracting moisture from the gas and;
impregnating the desiccant with moisture from said gas.

11. The method according to claim 10, further including the steps of:
stopping the flow of gas passed the first array of tubes;
passing a heated heat transfer liquid through the bore of the tubes of the first array, and so;
dissipating moisture from said desiccant, and so;
regenerating the desiccant.

12. The method according to claim 11, further including the steps of:
providing a second array of desiccant coated tubes,
commencing a first cycle of providing the heated heat transfer liquid to the first array and applying the gas to the second array;
regenerating the desiccant in the first array, then;
commencing a second cycle of applying the gas to the first array and providing heated heat transfer liquid to the second array, and so
regenerating the desiccant in the second array.

13. The method according to claim 10, wherein the tubes have an oblique cross-sectional shape.

* * * * *

UNITED STATES PATENT AND TRADEMARK OFFICE
CERTIFICATE OF CORRECTION

| | |
|---|---|
| PATENT NO. | : 12,055,315 B2 |
| APPLICATION NO. | : 16/973391 |
| DATED | : August 6, 2024 |
| INVENTOR(S) | : Mrinal Jagirdar and Poh Seng Lee |

It is certified that error appears in the above-identified patent and that said Letters Patent is hereby corrected as shown below:

In the Claims

Column 7, Line 2, Claim 4, cancel the text "and the gas to the second array sub-array so as to regenerate" and insert the following text: --and the gas to the second array so as to regenerate--.

Column 7, Line 24, Claim 8, cancel the text "claim 1, wherein heat used for regeneration is provide from" and insert the following text: --claim 1, wherein heat used for regeneration is provided from--.

Column 8, Line 12, Claim 11, cancel the text "stopping the flow of gas passed the first array of tubes;" and insert the following text: --stopping the flow of gas passed through the first array of tubes;--.

Signed and Sealed this
First Day of October, 2024

Katherine Kelly Vidal
*Director of the United States Patent and Trademark Office*